US012700082B2

(12) United States Patent
Dudovich et al.

(10) Patent No.: US 12,700,082 B2
(45) Date of Patent: Aug. 4, 2026

(54) TRAINING A MACHINE LEARNING PROCESS FOR USE IN EVALUATING A SUBSTRATE

(71) Applicant: Applied Materials Israel Ltd., Rehovot (IL)

(72) Inventors: Boaz Dudovich, Rehovot (IL); Lev Koushnir, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 335 days.

(21) Appl. No.: 18/410,895

(22) Filed: Jan. 11, 2024

(65) Prior Publication Data

US 2025/0232430 A1      Jul. 17, 2025

(51) Int. Cl.
G06T 7/00          (2017.01)
G06N 20/00          (2019.01)
G06V 10/774          (2022.01)

(52) U.S. Cl.
CPC ........... G06T 7/001 (2013.01); G06T 7/0006 (2013.01); *G06T 2207/20081* (2013.01); *G06T 2207/30148* (2013.01)

(58) Field of Classification Search
CPC ................... G06T 7/001; G06T 7/0006; G06T 2207/20081; G06T 2207/30148
See application file for complete search history.

(56) References Cited

U.S. PATENT DOCUMENTS

| | | | |
|---|---|---|---|
| 2021/0148834 A1* | 5/2021 | Leobandung | ...... G01B 11/0616 |
| 2021/0174200 A1* | 6/2021 | Huang | .................... G06N 3/045 |
| 2021/0287352 A1* | 9/2021 | Calderon | ............. G06V 10/772 |
| 2025/0155378 A1* | 5/2025 | Freytag | ............. G01N 21/8851 |

* cited by examiner

*Primary Examiner* — Oneal R Mistry
*Assistant Examiner* — Nhut Huy Pham
(74) *Attorney, Agent, or Firm* — Kilpatrick Townsend & Stockton LLP

(57)          ABSTRACT

A method for training a machine learning process, the method includes obtaining signatures of substrate patterns of a training related substrate; finding first signatures of reference patterns that are similar to the signatures of the substrate patterns, the reference patterns are associated with defects previously defined as defects of interest, the finding is executed regardless of one or more parameters that impact a generation of the first reference signatures; populating a defects of interest dataset with second signatures of the reference patterns that convey more information about the defects previously defined as defects of interest than the first signatures of the reference patterns; populating another dataset with additional signatures; and training, in a supervised manner, the machine learning process to find defects of interest, wherein the training includes feeding the defects of interest dataset and the other dataset to the machine learning process.

18 Claims, 5 Drawing Sheets

Obtaining signatures of substrate patterns of a training related substrate. 110

Finding first signatures of reference patterns that are similar to the signatures of the substrate patterns. 120

Populating a defects of interest dataset with second signatures of the reference patterns. 130

Populating another dataset with additional signatures of additional patterns of the training related substrate. 140

100

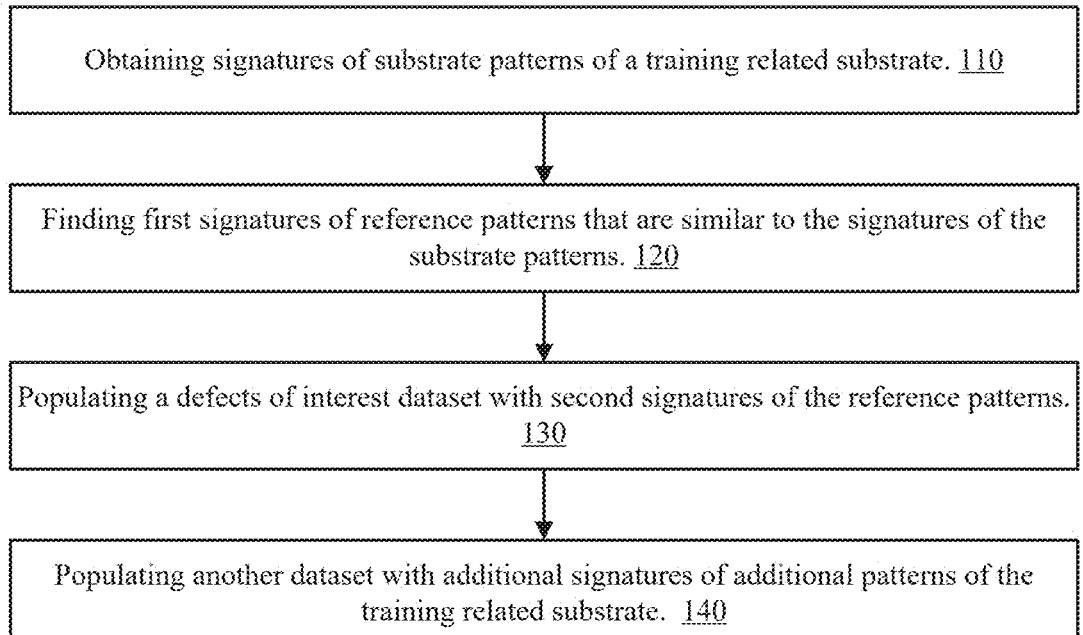

Obtaining signatures of substrate patterns of a training related substrate. 110

Finding first signatures of reference patterns that are similar to the signatures of the substrate patterns. 120

Populating a defects of interest dataset with second signatures of the reference patterns. 130

Populating another dataset with additional signatures of additional patterns of the training related substrate. 140

Figure 2:
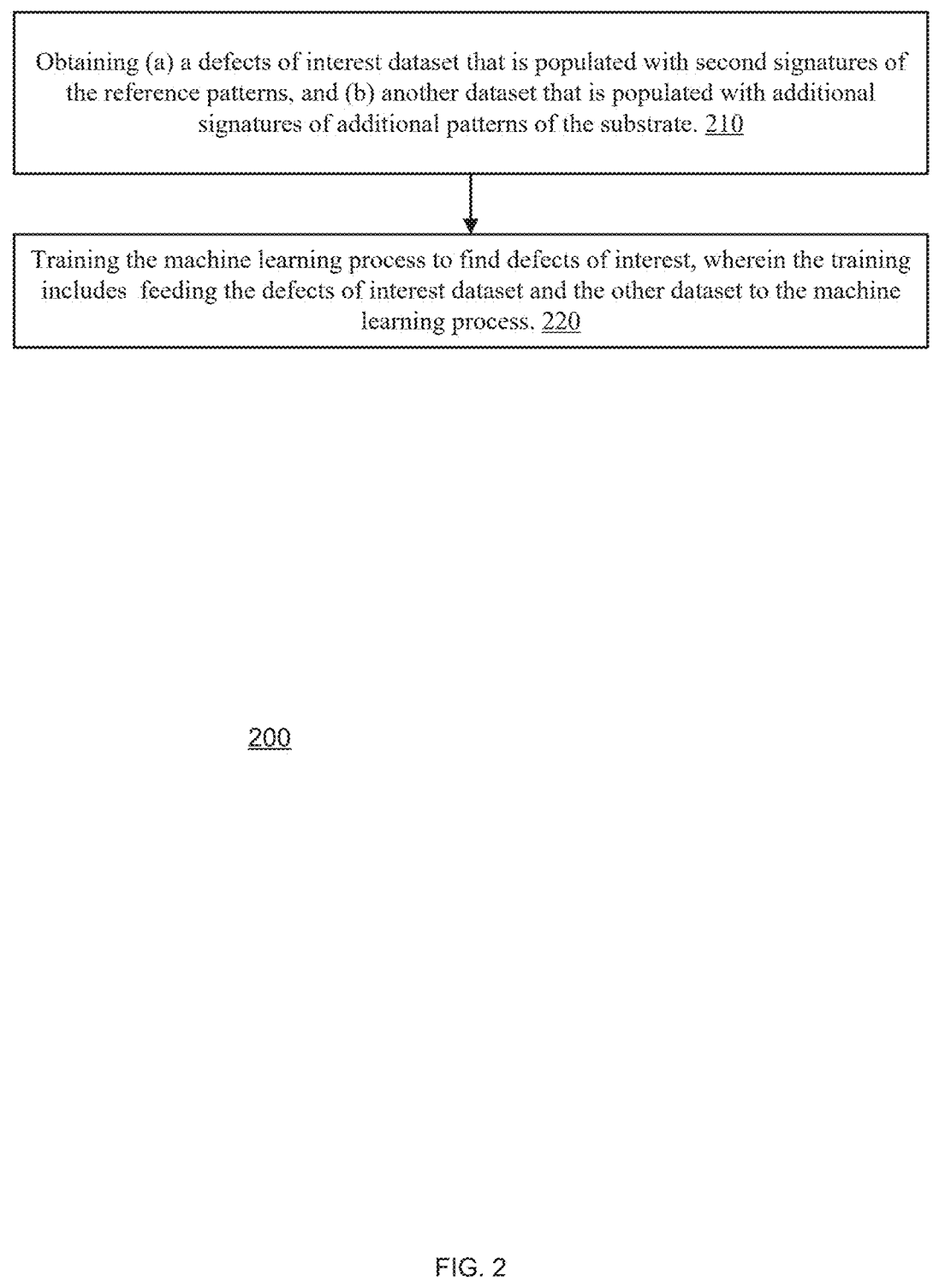

Obtaining (a) a defects of interest dataset that is populated with second signatures of the reference patterns, and (b) another dataset that is populated with additional signatures of additional patterns of the substrate. 210

Training the machine learning process to find defects of interest, wherein the training includes feeding the defects of interest dataset and the other dataset to the machine learning process. 220

Obtaining signatures of substrate patterns of a training related substrate. 310

Applying the machine learning process on the image of the region to find one or more defects of interest that are associated with one or more given evaluated patterns of the evaluated patterns. 320

Responding to the finding of the one or more defects. 330

300

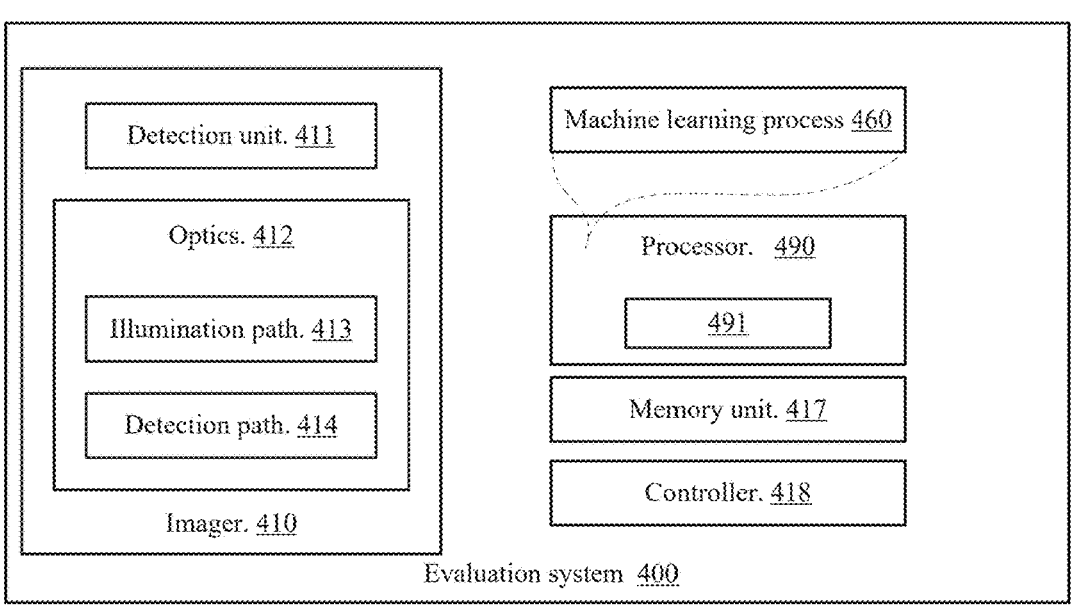

Detection unit. 411

Optics. 412

Illumination path. 413

Detection path. 414

Imager. 410

Machine learning process 460

Processor.    490

491

Memory unit. 417

Controller. 418

Evaluation system  400

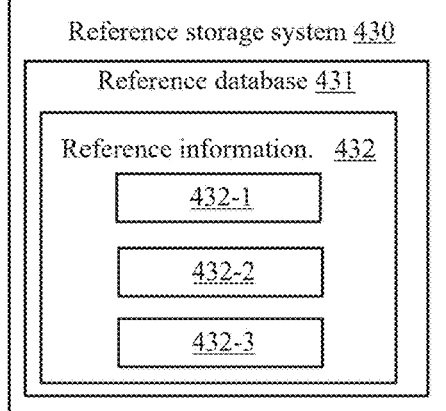

Reference storage system 430

Reference database 431

Reference information.   432

432-1

432-2

432-3

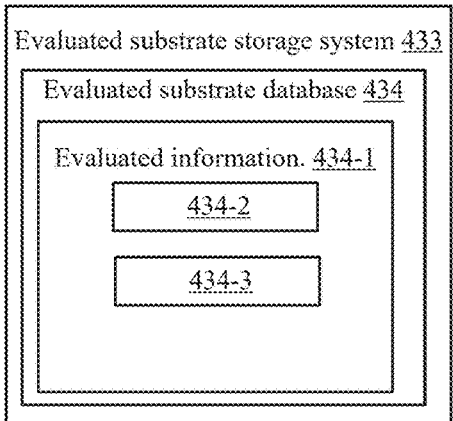

Evaluated substrate storage system 433

Evaluated substrate database 434

Evaluated information. 434-1

434-2

434-3

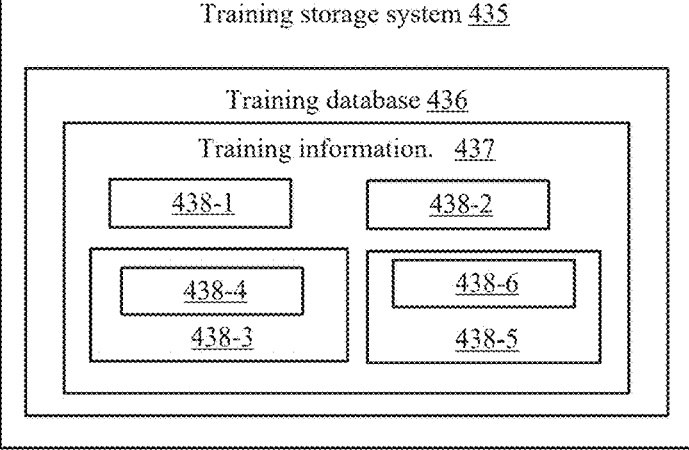

Training storage system 435

Training database 436

Training information.   437

438-1

438-2

438-4

438-6

438-3

438-5

Machine learning process
training unit. 450

FIG. 4

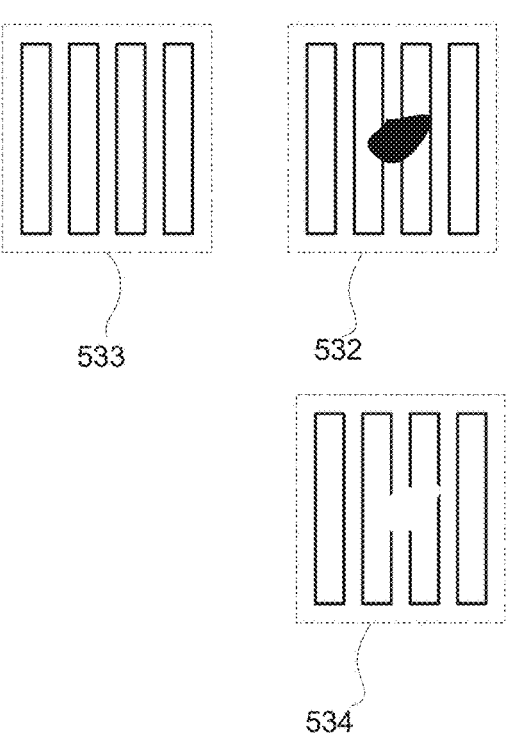
533   532
534
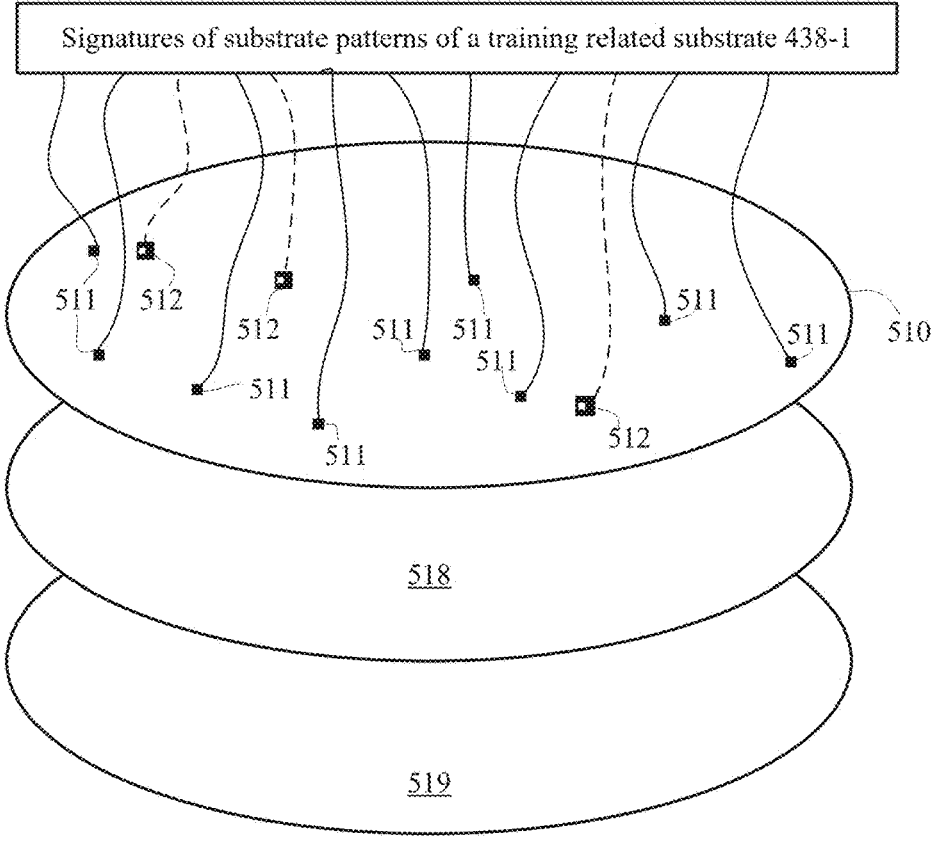
FIG. 5

TRAINING A MACHINE LEARNING PROCESS FOR USE IN EVALUATING A SUBSTRATE

BACKGROUND

Machine learning processes are used for solving many problems in many technological fields.

The performance (for example accuracy) of a machine learning process is based, at least in part, on the amount and quality of examples used during the training of the machine learning process. The examples may be tagged error information.

It has been found that machine learning processes used for evaluating semiconductor wafers suffer from a very limited training process that is based on a very small number of examples.

There is a growing need to improve the performance of a machine learning process used for evaluating semiconductor wafers.

SUMMARY

There is provided an evaluation system utilizing a machine learning process, the evaluation system includes (a) an imager that is configured to obtain an image of a region of an evaluated substrate; the evaluated substrate includes evaluated patterns, and (b) a processor that includes one or more processing circuits, the processor is configured to apply the machine learning process on the image of the region to find a defect of interest that is associated with a given evaluated pattern of the evaluated patterns. The machine learning process was trained to find defects of interest, wherein a training of the machine learning process includes feeding a defects of interest dataset and another dataset to the machine learning process. The defects of interest dataset was generated by (i) obtaining signatures of substrate patterns of a training related substrate; (ii) finding first signatures of reference patterns that are similar to the signatures of the substrate patterns; wherein the reference patterns are associated with defects previously defined as defects of interest; wherein the finding is executed regardless of one or more parameters that impact a generation of the first reference signatures; and (iii) populating the defects of interest dataset with second signatures of the reference patterns, the second signatures of the reference patterns convey more information about the defects previously defined as defects of interest than the first signatures of the reference patterns. The other another dataset was populated with additional signatures of additional patterns of the substrate.

There is provided a non-transitory computer readable medium for training a machine learning process, the non-transitory computer readable medium stores instructions that once executed by a processor that includes one or more processing circuits, causes the processor to: (a) obtain signatures of substrate patterns of a training related substrate; (b) find first signatures of reference patterns that are similar to the signatures of the substrate patterns; wherein the reference patterns are associated with defects previously defined as defects of interest; wherein the finding is executed regardless of one or more parameters that impact a generation of the first reference signatures; (c) populate a defects of interest dataset with second signatures of the reference patterns, the second signatures of the reference patterns convey more information about the defects previously defined as defects of interest than the first signatures of the reference patterns; (d) populate another dataset with additional signatures of additional patterns of the substrate; and (e) train, in a supervised manner, the machine learning process to find defects of interest, wherein the training includes feeding the defects of interest dataset and the other dataset to the machine learning process.

There is provided a method for training a machine learning process, the method includes (a) obtaining signatures of substrate patterns of a training related substrate; (b) finding first signatures of reference patterns that are similar to the signatures of the substrate patterns; wherein the reference patterns are associated with defects previously defined as defects of interest; wherein the finding is executed regardless of one or more parameters that impact a generation of the first reference signatures; (c) populating a defects of interest dataset with second signatures of the reference patterns, the second signatures of the reference patterns convey more information about the defects previously defined as defects of interest than the first signatures of the reference patterns; (d) populating another dataset with additional signatures of additional patterns of the training related substrate; and (e) training, in a supervised manner, the machine learning process to find defects of interest, wherein the training includes feeding the defects of interest dataset and the other dataset to the machine learning process.

BRIEF DESCRIPTION OF THE DRAWINGS

The subject matter regarded as the embodiment is particularly pointed out and distinctly claimed in the concluding portion of the specification. The embodiment, however, both as to organization and method of operation, together with specimen s, features, and advantages thereof, may best be understood by reference to the following detailed description when read with the accompanying drawings in which:

FIG. 1 illustrates an example of a method;

FIG. 2 illustrates an example of a method;

FIG. 4 illustrates an example of an evaluation system and its environment; and FIG. 5 illustrates an example of one or more substrates.

Figure 3:
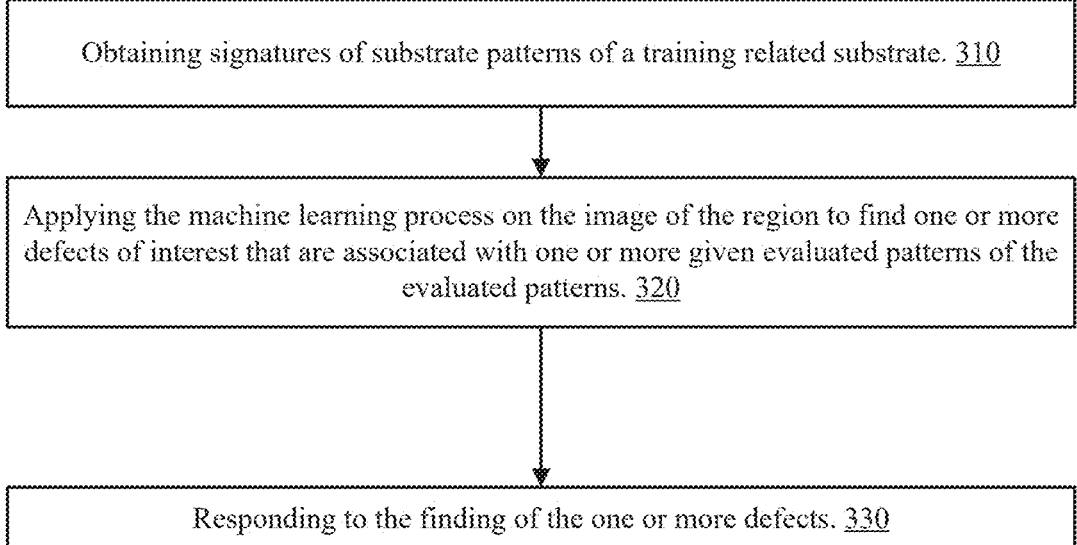
FIG. 3 illustrates an example of a method.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

There is provided a solution related to the evaluation of an evaluated substrate such as but not limited to a wafer—especially a wafer having at least one semiconductor portion.

An evaluation of the evaluated substrate may include an inspection of the evaluated substrate to find defects or an inspection of the evaluated substrate to find suspected defects.

An evaluated substrate may exhibit defects of multiple types. Only some of the multiple types may be of interest. Defects that belong to a type of interest are termed defects of interest. A definition of which defects are defects of interest may be determined in many manners—for example defects of interest may be defined by a customer of the evaluated substrate, by a manufacturer of the evaluated substrate, and the like.

There is provided a solution for dramatically increasing the number of labeled examples provided to a machine learning process during supervised training—therefor increasing the performance (for example accuracy) of the machine learning process.

The increase in the number of labeled examples allowed to train the machine learning process in a supervised manner—and provide a machine learning process that is more accurate than a corresponding machine learning process that was trained using an unsupervised training process or a semi-supervised training process.

Examples of unsupervised or semi-supervised trained machine learning processes include:

a. Auto-encoders for the anomaly detection.

b. Statistical modelling of "typical" pixel values and detection of strong deviations from this model.

c. Self-supervied learning, that distinguish between the valid and abnormal transformations.

d. Semi-supervised training with the synthetic planted defects.

There is provided a solution for evaluating patterns of substrates such as semiconductor wafers using a machine learning process that is highly accurate. Other substrate may be provided. The accuracy of the machine learning process is contributed, at least in part, by using a machine learning process that was trained in a supervised manner to detect defects of interest using an increased number of labeled examples.

The lack of samples is contributed by:

a. The dimensions of patterns of substrates continue to shrink and reach a sub-micron scale and even reach nanometric scale.

b. The evaluation of the substrate includes illuminating the patterns with radiation that has a wavelength of a same order as the dimensions of the patterns—which results on detection signals that are hard to understand.

c. The detection signals dramatically change from one inspection recipe to another, dramatically change between one semiconductor to the other, and dramatically change between one layer of the semiconductor to the other.

d. The training of a machine learning process used to evaluate a certain layer of a certain substrate and using a certain recipe is limited to labeled examples previously obtained from the certain layer of one or more reference substrate that are expected to be identical to the evaluated substrate) and using the certain recipe.

It has been surprisingly found that in contrary to the limitation (d) above—that the number of labeled examples may be dramatically increased when searching for labeled examples obtain from a much larger number of reference substrate—by ignoring at least one of:

a. A difference between a training related substrate (used along with one or more reference substrates during the building of at least one dataset used for training) and one or more reference substrates. Accordingly—a labeled example may be taken from a reference substrate may differ from the training related substrate by manufacturer, by design and/or layout, and the like.

b. At least one difference between different layers of the training related substrate and of the one or more reference substrates. Accordingly—a labeled example can be taken from another layer of a reference substrate.

c. Ignoring at least one difference between the a recipe used recipes used for inspection. Accordingly—a labeled example may be taken using a recipe that differs from the recipe used to obtain information from the training related substrate.

The ignoring of the one or more differences is especially beneficial when inspecting a new semiconductor wafer of a type or vendor that was not inspected before.

It should be noted that a training or a retraining of the machine learning process may occur under one or more circumstances—for example:

a. When the training related substrate in new—in the sense that it was not evaluated in the past by the machine learning process.

b. When inference results are deemed to be inaccurate—whereas what amounts to being inaccurate may be defined in any manner—for example by a customer of the evaluated substrate, by a manufacturer of the evaluated substrate, and the like.

c. When at least a predefined period (or at least a number of evaluations) have passed since the last training—whereas what amounts to the predefined period and/or enough evaluations that merit a training or retraining—may be defined in any manner—for example by a customer of the evaluated substrate, by a manufacturer of the evaluated substrate, and the like.

d. Following a reception of an indication of significant process variations. The indication may be provided from a third party not related to the evaluation process. What amounts to significant process variations—may be defined in any manner—for example by a customer of the evaluated substrate, by a manufacturer of the evaluated substrate, and the like.

e. When receiving a new batch of substrates.

It should be noted that the training or retraining of the machine learning process may be triggered for a certain layer or layers of an evaluated substrate. For example—the evaluation of one layer may be deemed to be accurate enough—and does not need retraining—while evaluation of another layer may be deemed inaccurate—and the machine learning process should be adapted to better evaluate that other layer.

FIG. 1 is an example of method 100 for building a dataset that includes labeled examples used to train a machine learning process. The building of the dataset provides multiple examples.

According to an embodiment, method 100 starts by step 110 of obtaining signatures of substrate patterns of a training related substrate. The substrate is training related in the sense that is used during the building of the dataset. According to an embodiment, the usage includes generating the signatures of the substrate patterns. The generating may include illuminating the training related substrate during step 110 to provide detection signals and generating the signatures of the substrate patterns based on the detection signals.

A signature of a substrate pattern is information that represents the substrate pattern.

Examples of a signature of a reference pattern includes:

a. An image of the substrate pattern. The image may include any number of pixels—for example—a 64 by 64 pixels image, or any other sized image.

b. An embedding of the substrate pattern.

c. A compressed representation of the substrate pattern.

d. Any other representation of the substrate pattern.

According to an embodiment, step 110 is followed by step 120 of finding first signatures of reference patterns that are similar to the signatures of the substrate patterns.

According to an embodiment, the finding is executed regardless of one or more parameters that impact a generation of the first signatures of the reference patterns.

According to an embodiment, the one or more parameters include an image acquisition process used during a generation of the first reference signatures. For example—any recipe parameter such as polarization of illumination path, polarization of reception path, wavelength of illumination, wavelength passable through the reception path, intensity of illumination, attenuation of reception path, and the like.

According to an embodiment, the one or more parameters include a source of the substrate patterns. A source includes a substrate, a layer of a substrate and a combination thereof.

According to an embodiment, the reference patterns are associated with defects previously defined as defects of interest. The reference patterns may belong to any substrate—including substrates that differ from the training related substrate—even substrates manufactured or designed by other vendors than the manufacture or the designer of the training related substrate.

According to an embodiment, the reference patterns belong to layers that differ from the layer of the substrate patterns of the training related substrate.

According to an embodiment, the first signature of reference patterns is obtained using another recipe that differs from a recipe that was used for generating the signatures of the substrate patterns of the training related substrate. Alternatively, the first signature of reference patterns is obtained using the recipe that was used for generating the signatures of the substrate patterns of the training related substrate.

According to an embodiment, step 120 is followed by step 130 of populating a defects of interest dataset with second signatures of the reference patterns.

The second signatures of the reference patterns convey more information about the defects previously defined as defects of interest than the first signatures of the reference patterns.

According to an embodiment, the second signatures include signatures of reference patterns that include defects, even when the presence of the defects impact the similarity test used in step 120. For example—assuming that a signature of a pattern includes an image of 64 by 64 pixels, and that a defect having a size of at least 12 by 12 pixel may prevent finding similar reference signatures. In this assumption—the first signature represents a defect free pattern and the second signature will represent the defective. The defect free pattern may be previously checked to be defect free or may be a pattern in which the defect is at least partially masked.

According to an embodiment, step 130 is followed by step 140 of populating another dataset with additional signatures of additional patterns of the training related substrate.

According to an embodiment, the additional signatures are estimated or determined to be signatures of OK patterns.

According to an embodiment, assuming that the manufacturing process exhibits a satisfactory yield (for example a yield of about 95, 96, 97, 99, 99.2, 99.4, 99.6, 99.9, 99.9, 99.99. 99.998 percent and more)—then the additional signatures may be selected in any manner—for example in a random manner—out of the signatures of the training related substrate.

According to an embodiment, the additional signatures are labeled as signatures of OK patterns, and the second signature are labeled as signatures of defective patterns.

FIG. 2 is an example of method 200 for training a machine learning process.

According to an embodiment, method 200 starts by step 210 of obtaining (a) a defects of interest dataset that is populated with second signatures of the reference patterns, and (b) another dataset that is populated with additional signatures of additional patterns of the substrate.

According to an embodiment, step 210 includes one of:
a. Receiving the defects of interest dataset and receiving the other dataset.
b. Generating the defects of interest dataset and receiving the other dataset.
c. Receiving the defects of interest dataset and generating the other dataset.
d. Generating the defects of interest dataset and generating the other dataset.

According to an embodiment, step 210 is followed by step 220 of training the machine learning process to find defects of interest, wherein the training includes feeding the defects of interest dataset and the other dataset to the machine learning process.

According to an embodiment, the additional signatures are labeled as signatures of OK patterns, and the second signature are labeled as signatures of defective patterns.

According to an embodiment, at least one the obtaining of the dataset, the training of the machine learning, or the evaluation of an evaluated substrate by an evaluation system are executed by a party that differs from a manufacturer of the evaluation system.

According to an embodiment, any of the methods illustrated in the specification include keeping information obtained during any of the methods in secret—and even preventing the manufacturer access such information.

FIG. 3 is an example of method 300 for evaluating a substrate.

According to an embodiment, method 300 starts by step 310 obtaining an image of a region of an evaluated substrate. The evaluated substrate includes evaluated patterns. The region may be of any size or have an area that is any fraction of the overall size of the substrate.

According to an embodiment, step 310 is followed by step 320 of applying the machine learning process on the image of the region to find one or more defects of interest that are associated with one or more given evaluated patterns of the evaluated patterns.

According to an embodiment, the machine learning process was trained by executing method 200.

According to an embodiment, step 320 is followed by step 330 of responding to the finding of the one or more defects.

According to an embodiment, step 330 includes one of: storing the outcome of step 320, preventing access of third parties to at least the outcome of step 320, determining whether the machine learning process should be adjusted or retrained, triggering or instructing or requesting an adjustment or a retraining of the machine learning process, determine whether the outcome of step 320 is indicative of process variations, and the like.

FIG. 4 is an example of an evaluation system 400 and its environment.

A non-limiting example of an evaluation system 400 is the ENLIGHT™ optical inspection of Applied Materials Inc. of Santa Clara, California. USA.

The evaluation system 400 includes an imager 410, memory unit 417, a controller 418 and a processor 490 that includes one or more processing circuits 491. The imager 410 includes a detection unit 411, and optics 412 that include an illumination path 413 for illuminating the substrate and a reception path 414 (also known as a collection path) for collecting illumination from the substrate.

FIG. 4 illustrates the environment of the evaluation system as including:

a. Reference storage system 430 for storing a reference database 431 that includes reference information 432 such as first signatures 432-1 of reference patterns, and second signatures 432-2 of reference patterns, and (ii) defects of interest metadata 432-3 defining what amounts to defects of interest.

b. Evaluated substrate storage system 433 for storing an evaluated substrate database 434 that includes evaluated information 434-1 about the substrate such as one or more images 434-2 of one or more regions of the substrate or any other detection signals generated during the scanning or other illumination of the substrate, signatures 434-3 of evaluated patterns.

c. Training storage system 435 for storing training database 436 that stores a training information 437 that includes signatures 438-1 of substrate patterns of a training related substrate, first signatures 438-2 of reference patterns that are similar to the signatures of the substrate patterns, defects of interest dataset 438-3 that includes second signatures 438-4 of the reference patterns, and another dataset 438-5 with additional signatures 438-6 of additional patterns of the training related substrate.

d. Machine learning process training unit 450 configured to train machine learning process 460.

e. Processor 490 that includes one or more processing circuits 491. The processor 490 is configured to apply the machine learning process 460 on images of regions of evaluated substrates to find defects of interest that are associated with given evaluated patterns of the evaluated patterns.

FIG. 5 illustrates an example of a testing related substrate 510, one or more reference substrates 518 and an evaluated substrate 519.

The testing related substrate 510 is illuminated to generate detection signals that are processed to provide signatures of substrate patterns of a training related substrate 438-1. Some of the patterns are OK (see OK patterns 511) and some are found to be associated with defects of interest (see defect of interest patterns 512).

FIG. 5 also illustrates a second signature 532 (in this case a compact image) of a pattern that includes defect of interest, and two versions of a first signature 533 and 534 of the pattern that do not include the defect of interest. In one version the pixels covered by the defect of interest are set to a default value of zero gray level. In the second version the pattern appears as if the defect of interest never existed.

According to an embodiment, the processing circuit is implemented as a central processing unit (CPU). According to an embodiment, the processing circuit is implemented as a graphic processing unit (GPU). According to an embodiment, the processing circuit is implemented as a hardware accelerator. According to an embodiment, the processing circuit includes one or more other integrated circuits such as application-specific integrated circuits (ASICs) or field programmable gate arrays (FPGAs) or full-custom integrated circuits.

In the foregoing detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method and should be applied mutatis mutandis to a computer program product that stores instructions that once executed result in the execution of the method.

Any reference in the specification to a system should be applied mutatis mutandis to a method that may be executed by the system and should be applied mutatis mutandis to a computer program product that stores instructions that can be executed by the system.

Any reference in the specification to a computer program product should be applied mutatis mutandis to a method that may be executed when executing instructions stored in the computer program product and should be applied mutandis to a system that is configured to executing instructions stored in the computer program product.

The term "and/or" means additionally or alternatively. For example A and/or B means only A, or only B or A and B.

In the foregoing description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to a support unit should be applied mutatis mutandis to a method that may be executed by the support unit.

The term "and/or" means additionally or alternatively. For example, A and/or B means only A, or only B or A and B.

In the foregoing specification, the embodiments of the disclosure have been described with reference to specific examples of embodiments. It will, however, be evident that various modifications and changes may be made therein without departing from the broader spirit and scope of the appended claims.

Moreover, the terms "front," "back," "top,", "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

Any reference to the term "comprising" or "having" or "including" should be applied mutatis mutandis to "consisting" and/or should be applied mutatis mutandis to "consisting essentially of".

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiment.

We claim:

1. A method for training a machine learning process, the method comprising:
   obtaining signatures of substrate patterns of a training related substrate;
   finding first signatures of reference patterns that are similar to the signatures of the substrate patterns; wherein the reference patterns are associated with defects previously defined as defects of interest;

wherein the finding is executed regardless of one or more parameters that impact a generation of the first reference signatures;
   populating a defects of interest dataset with second signatures of the reference patterns, the second signatures of the reference patterns convey more information about the defects previously defined as defects of interest than the first signatures of the reference patterns;
   populating another dataset with additional signatures of additional patterns of the training related substrate; and
   training, in a supervised manner, the machine learning process to find defects of interest, wherein the training comprises feeding the defects of interest dataset and the other dataset to the machine learning process,
   wherein the reference patterns exhibit defects having a less than a defined impact on a similarity between the first signatures and the signatures of the substrate patterns, and wherein the second signatures exhibit defects having more than the defined impact on a similarity between the second signatures and the signatures of the substrate patterns.

2. The method according to claim 1 wherein the training is followed by evaluating the training related substrate by the machine learning process.

3. The method according to claim 1 wherein the training is followed by evaluating, by the machine learning process, one or more evaluated substrates that differ from the training related substrate.

4. The method according to claim 1, wherein the method further comprises:
   applying the machine learning process, following the training, by an evaluation system, to find defects of interest of one or more evaluated substrates, and
   preventing access of a manufacturer of the evaluation system to an outcome of the applying of the machine learning process.

5. The method according to claim 1, wherein the one or more parameters comprise an image acquisition process used during a generation of the first reference signatures.

6. The method according to claim 1, wherein the one or more parameters comprise a source of the substrate patterns.

7. The method according to claim 1, wherein the additional patterns of the training related substrate are defect free reference patterns.

8. The method according to claim 1, wherein the reference patterns belong to one or more other substrates that differ from the training related substrate.

9. The method according to claim 1, wherein the additional signatures are generated based on random sampling of the training related substrate.

10. The method according to claim 1, wherein the signatures of the substrate patterns are generated using an evaluation system, wherein the method further comprises preventing access of a manufacturer of the evaluation system to at least (a) the machine learning process, (b) the defects of interest dataset, and (c) the other dataset.

11. A non-transitory computer readable medium for training a machine learning process, the non-transitory computer readable medium stores instructions that once executed by a processor that comprises one or more processing circuits, causes the processor to:
   obtaining signatures of substrate patterns of a training related substrate;
   finding first signatures of reference patterns that are similar to the signatures of the substrate patterns; wherein the reference patterns are associated with defects previously defined as defects of interest; wherein the finding is executed regardless of one or more parameters that impact a generation of the first reference signatures;

populating a defects of interest dataset with second signatures of the reference patterns, the second signatures of the reference patterns convey more information about the defects previously defined as defects of interest than the first signatures of the reference patterns;

populating another dataset with additional signatures of additional patterns of the substrate; and training, in a supervised manner, the machine learning process to find defects of interest, wherein the training comprises feeding the defects of interest dataset and the other dataset to the machine learning process, wherein the reference patterns exhibit defects having a less than a defined impact on a similarity between the first signatures and the signatures of the substrate patterns, and wherein the second signatures exhibit defects having more than the defined impact on a similarity between the second signatures and the signatures of the substrate patterns.

12. An evaluation system utilizing a machine learning process, the evaluation system comprises:

an imaging device that is configured to obtain an image of a region of an evaluated substrate; the evaluated substrate comprises evaluated patterns;

a processor that comprises one or more processing circuits, the processor is configured to apply the machine learning process on the image of the region to find a defect of interest that is associated with a given evaluated pattern of the evaluated patterns;

wherein the machine learning process was trained to find defects of interest, wherein a training of the machine learning process comprised feeding a defects of interest dataset and another dataset to the machine learning process;

(i) wherein the defects of interest dataset was generated by:

obtaining signatures of substrate patterns of a training related substrate;

finding first signatures of reference patterns that are similar to the signatures of the substrate patterns;

wherein the reference patterns are associated with defects previously defined as defects of interest; wherein the finding is executed regardless of one or more parameters that impact a generation of the first reference signatures; and populating the defects of interest dataset with second signatures of the reference patterns, the second signatures of the reference patterns convey more information about the defects previously defined as defects of interest than the first signatures of the reference patterns, wherein the reference patterns exhibit defects having a less than a defined impact on a similarity between the first signatures and the signatures of the substrate patterns, and wherein the second signatures exhibit defects having more than the defined impact on a similarity between the second signatures and the signatures of the substrate patterns;

(ii) wherein the other another dataset was populated with additional signatures of additional patterns of the substrate.

13. The evaluation system according to claim 12, wherein the one or more parameters comprise an image acquisition process used during a generation of the first reference signatures.

14. The evaluation system according to claim 12, wherein the one or more parameters comprise a source of the substrate patterns.

15. The evaluation system according to claim 12, wherein the additional patterns of the substrate are defect free reference patterns.

16. The evaluation system according to claim 12, wherein the reference patterns belong to one or more other substrates that differ from the training related substrate.

17. The evaluation system according to claim 12, wherein the additional signatures are generated based on random sampling of the training related substrate.

18. The evaluation system according to claim 12, wherein the processor is configured to prevent access of a manufacturer of the evaluation system to an outcome of the applying of the machine learning process.

* * * * *